United States Patent [19]

Thyberger et al.

[11] 4,075,861
[45] Feb. 28, 1978

[54] METHOD OF LAYING PIPES OR CONDUITS IN THE GROUND AND PIPE ARRANGEMENT PRODUCED THEREBY

[75] Inventors: Filip Bertil Thyberger; Kurt Olle Ragnvald Lindström, both of Vasteras, Sweden

[73] Assignee: Granges Essem Aktiebolag, Sweden

[21] Appl. No.: 650,998

[22] Filed: Jan. 21, 1976

Related U.S. Application Data

[63] Continuation of Ser. No. 300,406, Oct. 20, 1972, abandoned.

[51] Int. Cl.² ............................ F16L 1/00; F16L 9/14
[52] U.S. Cl. ...................................... 61/105; 138/32; 138/105; 138/149
[58] Field of Search ...................... 61/72.1, 72.6, 72.7, 61/72.5, 105; 138/32, 105, 149, 106, 113, 111

[56] References Cited

U.S. PATENT DOCUMENTS

| 2,901,775 | 9/1959 | Goff | 61/72.1 |
| 3,613,380 | 10/1971 | Tarner | 61/46 |
| 3,807,458 | 4/1974 | Royston | 138/149 |

FOREIGN PATENT DOCUMENTS

| 1,227,145 | 2/1960 | France | 61/72.1 |
| 281,724 | 6/1928 | United Kingdom | 61/72.1 |

*Primary Examiner*—Jacob Shapiro
*Attorney, Agent, or Firm*—Arthur A. March

[57] ABSTRACT

A method of laying heating medium conveying pipes, wherein a pipe receiving trench is prepared and pipes, wrapped in heat insulating jackets permitting transversal relative movements of the pipes within the jackets, are placed in the trench. The pipes and the insulating jackets are then bent to follow a serpentine path and the trench filled to cover the pipes.

7 Claims, 6 Drawing Figures

METHOD OF LAYING PIPES OR CONDUITS IN THE GROUND AND PIPE ARRANGEMENT PRODUCED THEREBY

This is a continuation of application Ser. No. 300,406 filed on Oct. 20, 1972 now abandoned.

The present invention relates to a method of laying in the ground pipes or conduits intended for conveying flowing media at all temperatures in a substantially stress-free way.

When laying pipe means such as pipes or conduits, for example, for conveying heating media from a remotely situated central system to different consumer points it has hitherto been normal to arrange the pipes in a manner such as to enable them to be freely moved longitudinally in the passages, culverts etc. in which they are arranged. This means that some form of expansion take-up means must be arranged in the liquid distributing system, in order to overcome the consequences of variations in temperature normally occurring in such heat transport systems.

The most usual expansion take-up means comprise so-called expansion loops or expansion boxes. Neither of these two devices is particularly suited for use in remote heat distributing systems, however. The expansion loop namely involves the introduction into the system of a number of extra bends or curves, which give rise to an additional resistance to the flow of the medium distributed in the system, i.e. additional fluid stress in the conveying of flowing media through the corresponding pipe. In addition to the disadvantage of increased flow resistance, the expansion loop must also be so positioned as to permit freedom of movement thereof, i.e. mechanically stress-free thermal expansion and contraction of the pertinent portion of the pipe at variable temperatures. For this reason, it has been necessary when laying such remote heat conveying systems to arrange special cavities in the ground, resulting in a considerable increase in the total costs involved in installing the system. A number of solutions have been tested for the purpose of circumventing the aforementioned disadvantages, one such solution involving the use of metal tube bellowlike structure. Although it is possible to avoid the arrangement of special cavities in the ground when using such bellow constructions, it is not possible to reduce the flow resistance or fluid stress offered to the medium with such systems.

For the purpose of maintaining the lowest possible installation costs with remote heating systems, the two methods have been used side by side within one and the same systems, to take up longitudinal movements of the pipes or conduits, the alternative chosen depending on the dimensions of the pipes and their particular orientation in the ground.

In the case of main conduits, which because of their large dimensions are normally placed in pre-cast channels provided with covers, the use of expansion loops involves only slight additional cost, since the space required for such loops can be readily arranged when the channels are cast. The thickness of the pipe used for main conduits, however, renders it practically impossible to obtain a bellow structure of sufficient mobility and mechanical strength. With pipes of smaller dimensions, however, bellow structures can be used to advantage, since the pipes are often laid in groups in a protective tubular casing of eternite (asbestos cement lagging material) or a plastics material. In this way, the task of casting special wells or the like to accomodate the expansion loops can be avoided. Instead, the bellow structures can be placed in the space available, substantially in accordance with the principle described in U.S. Pat. No. 3,250,297.

When the remote heat conveying pipes are laid, for example, in a housing estate, both expansion loops and bellow structures can be omitted, since the distances between the different buildings are very short and the pipes are drawn through the building themselves. In this instance, the longitudinal movement of the pipes can be taken up in the curves and bends etc. arranged within the buildings. The pipes, however, should be drawn through the buildings to the least possible extent, since it is not always possible to obtain access to a particular building for the purpose of inspecting, maintaining or repairing the system, and also because substantial space is required for drawing the pipes through such buildings.

For the purpose of preventing loss of heat from the pipes by radiation, the pipes are normally insulated with an appropriate material. The heavy pipes placed in specially prepared channels are normally insulated manually after a number of pipe lengths has been placed and the pipe lengths welded to form a unit. With respect to pipes of smaller dimensions placed in a protective casing, either the casings or the pipes are insulated. Normally, however, a combination of these methods in used to obtain the best result, since it is then possible to use pipes which have been pre-insulated along their length, with the exception of the end zones, where the joint between mating pipe lengths is later to be made. In connection with these two methods the tubes are used in restricted lengths, to facilitate transport thereof. It is therefore necessary to make a large number of weld joints, each of which requires a considerable amount of manual labour, depending on the difficulties presented in welding around the pipes in the confined spaces in which the pipes are laid and, at the same time, to obtain welds of an acceptable quality.

When the pipes are laid in protective casings, it is also necessary, subsequent to terminating the welding operation, to apply insulating material to the pipes and to combine the casings in a manner such as to exclude the entry of moisture into the insulation. To this end, special jointing means are normally used.

The manual work involved when laying the pipes represents considerable effort, and since the method used requires a high degree of accuracy with respect to angular deviations between the pipes, so as to ensure that no additional stresses are caused in the pipes and casings, it is necessary to carefully plan the trench in which the pipes are to be placed.

In all of the aforementioned instances, means are required in each branch line from one pipe to another for taking up pipe movements caused by changes in length of the pipes. This is an important factor, particularly when laying remote heating systems within the areas where buildings are located relatively close to one another and where the pipes are to be drawn outside the buildings for the aforementioned purpose, e.g. under public passageways or roads etc.

The primary object of the invention is to eliminate the aforementioned disadvantages and to enable the work involved with laying such systems to be simplified, therewith reducing the costs associated when installing remote heating systems and above all such costs involved in connection with laying pipes of smaller dimensions.

Accordingly the invention is mainly characterized by digging a trench or the like in the ground in preparation for laying the pipes or conduits therein, and by placing in the trench lengths of pipe means such as pipes or conduits provided with a heat insulating jacket which permits transversal relative movements of the pipe within the jacket, and by bending the thus heat insulated pipe or conduit in serpentine or wave shaped loops, and by then filling in the trench to cover the heat insulated pipe or conduit.

The invention will now be described in more detail with reference to a number of examples thereof diagrammatically illustrated in the accompanying drawing, further features of the invention being made apparent in connection therewith.

Figure 1:
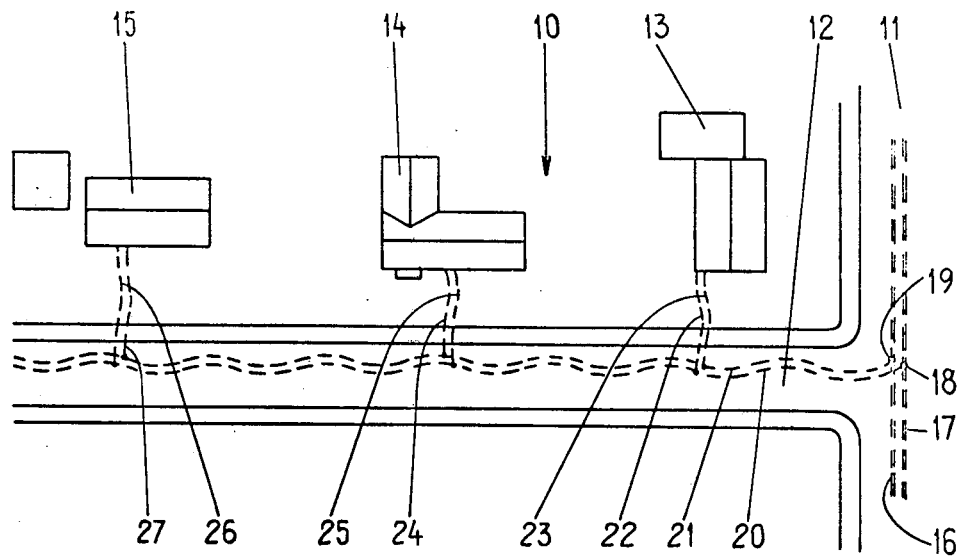
FIG. 1 illustrates diagrammatically in a horizontal view an alternative according to the invention for solving the problem of drawing pipes through a dwelling estate.

In the drawing, similar elements are identified with similar reference numerals, and the reference numeral 10 in FIG. 1 indicates generally a dwelling estate encircled by streets 11 and 12 and containing houses 13, 14, 15. The houses 13, 14, 15 in the housing estate 10 obtain heat from a central heating station (not shown), from which the heat is distributed in a transfer medium through a circulating system to the different consumer points in the houses 13, 14, 15.

The heat is distributed from a central heating station via a number of main pipes, represented in the drawing by conduits 16, 17 buried beneath the street 11, one conduit 16 comprising the supply line and the other conduit 17 comprising the return line for the medium circulating in the distribution system. The main conduits are provided at suitable points with connection 18, 19 to which pipes 20, 21 of smaller dimensions are joined and arranged to convey the heat transfer medium to the different consumer points, represented by the houses 13, 14, 15.

The main conduits 16, 17 and the lines 20, 21 are normally laid in the ground beneath the pathways or, optionally also under the streets. It is preferred to lay the pipes beneath the pathways, since such paths offer less obstruction by traffic when carrying out repairs and maintains work than do the streets.

With the housing estate illustrated in FIG. 1, the individual heating systems of the houses 13, 14, 15 are connected to the lines 20, 21 beneath the surface of the road 12 via branch pipes 22, 23, 24, 25, 26, 27, the lines being connected in a manner such that heat transfer medium from the main line 16 flows into the line 21 at the junction point 19, from where it passes via branch lines 23, 24, 27 to heat exchangers located in houses 13, 14, 15, and is then passed back to the central heating station via the branch lines 26, 25, 22, the distribution line 20 and the main line 17.

Figure 2:
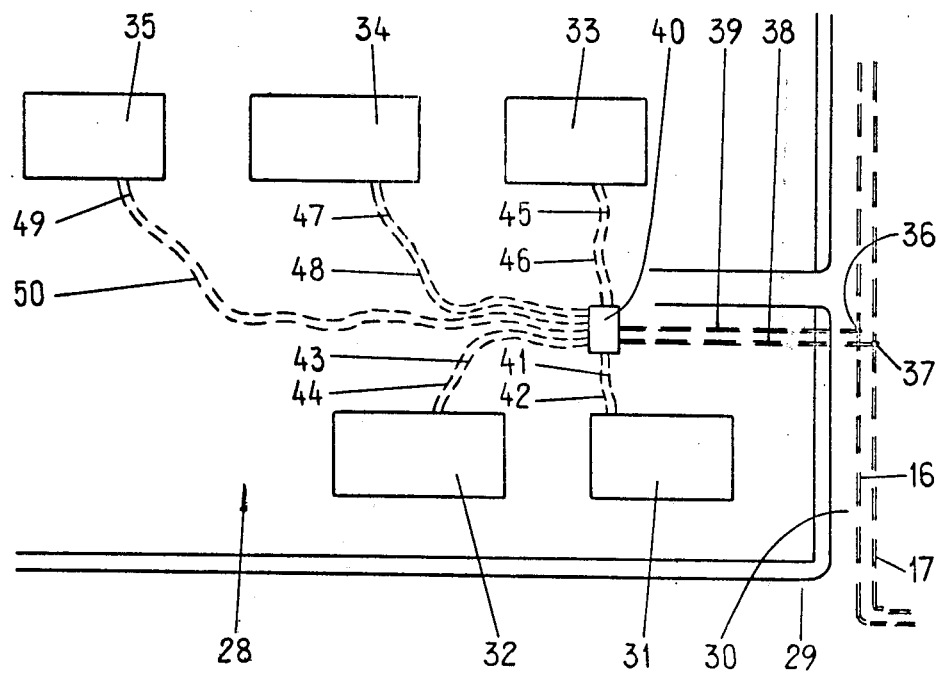
FIG. 2 illustrates diagrammatically and in a horizontal view a further alternative to the solution of drawing pipes through a domestic dwelling estate or an area of large blocks of dwelling apartments.

For the purpose of reducing the number of connection points, the system illustrated in FIG. 2 can be used, in which system the reference numeral 28 indicates a dwelling area defined by roads 29, 30 and containing houses 31, 32, 33, 34, 35. The main lines 16, 17 are buried beneath the road 30, and connected at junctions 36, 37 are lines 38, 39 which in certain instances may have the same dimensions as the main lines so that a distribution point or an intermediate heat exchanger 40 can be connected to the distribution system. Lines 41 – 50 extend from this distribution box or intermediate heat exchanger directly to the different buildings 31, 32, 33, 34, 35. The main advantage of the system is to be had with groups of buildings, where a special intermediate heat exchanger 40 is installed, a secondary system for heat distribution being obtained between the buildings and the intermediate heat exchanger.

Figure 3:
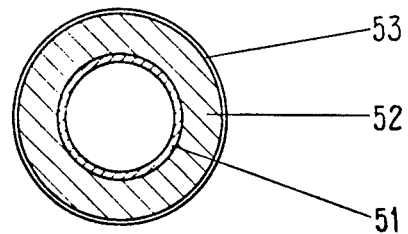
FIG. 3 is a cross sectional view of the pipes laid in the dwelling estates.

With the remote heat supply systems described with reference to FIGS. 1 and 2, the distribution lines 20, 21, the branch lines 22 – 27 and the lines 41 – 50 have been laid in accordance with the characteristic features of the invention, wherewith it was possible to avoid all expansions loops and expansion boxes previously used in these sections of the system, which are unsuitable and uneconomic in the present context. To achieve this, there is used in accordance with the invention pre-insulated pipes delivered from the factory in long lengths. When laying the system at pipes, the pipes are cut into suitable lengths to enable them to be joined at the different connection points. The pipes are cut to a length which is greater than the distance between respective connection points, whereafter the pipes are laid in a wavy line as illustrated in FIGS. 1 and 2. The requisite length of the pipes is readily calculated subsequent to establishing the extent to which the loops or wave crests should be curved, the extent of curvature of the pipes being adapted in a manner such that the variations in length of the inner pipe are taken up within the outer insulating layer surrounding the pipe, as illustrated in FIG. 3, said Figure showing a cross sectional view of a pipe 51 and insulating casing 53.

The pipe 51 is preferably made of metal and is encircled by a soft, relatively elastic heat insulating layer 52, which in turn is enclosed by a sealing and partially supporting layer 53 of a plastics material or the like. The properties of the soft, relatively elastic casing 52 shall be such that subsequent to laying the pipe in the ground and filling in the trench the inner pipe 51 is able to move radially or transversally within the outer casing 53 without appreciably disturbing the same.

Figure 6:
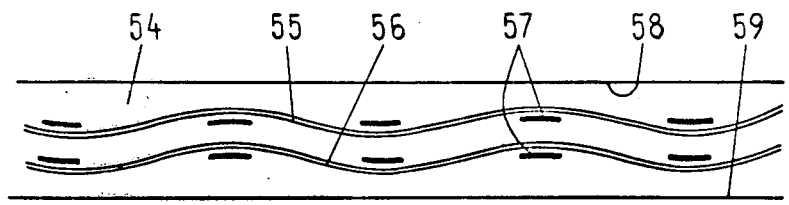
FIG. 6 is a horizontal view of a further alternative of laying the pipes in accordance with the invention.
Figure 5:
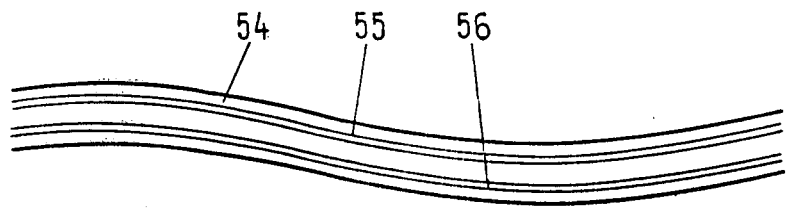
FIG. 5 is a horizontal view of an alternative manner of laying the pipes in accordance with the invention.
Figure 4:
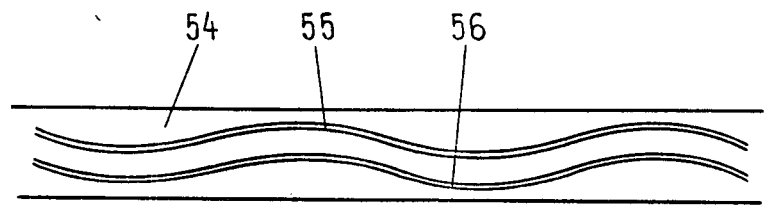
FIG. 4 is a horizontal view illustrating the manner in which the pipes are laid in a trench, in accordance with the invention.

With the alternative embodiment illustrated in FIG. 4, straight pipe trenches 54 are prepared and pipes 55, 56 are laid in a serpentine path therein, suitably on a bed of sand or the like to reduce the stresses thereon in the event of displacement of the ground. The method is both convenient and simple to effect, although it may cause the disadvantage whereby, owing to the fact that said pipes lie freely in the ground, said pipes may be relatively easily moved out of position and the desired serpentine path thereof lost. To avoid this the alternative illustrated in FIG. 5 may be employed, with which the trench 54 is given the same serpentine configuration as the pipes 55 and 56. However, since it is at times difficult to prepare serpentine shaped trenches 54 when laying pipes of small dimensions and where there is but a short distance between the crests of the waves of pipes 55, 56, it may be to advantage to apply the alternative illustrated in FIG. 6, in which the pipes are laid in a broad, straight trench 54 having anchored in the bottom thereof guide structures 57 in the form of posts, plates or the like, such that the pipes 55, 56 when laid in the trench around the guides 57 obtain the desired serpentine shape and are retained in position by said guides. The pipes 55, 56 need not lie on the bottom of the trench 54 so that the loops thereof extend in the horizontal plane, but instead the guides 57 may also be placed on the side walls 58, 59 of the trench 54 and the loops of the pipes extended in the vertical plane.

The described and illustrated method of laying pipes for distributing heat transfer media is not restricted to the aforementioned systems, but can be used with all pipe laying operations where it is necessary to take up changes in length of the pipes or conduits caused by differences in temperature. The only limiting factor is that the dimensions of the pipes shall be such as to permit said pipes to be curved in practice and laid in a serpentine path.

To render the laying of pipes as economic as possible, access should be had to pipe material in considerable, continuous lengths. The pipes are therefore delivered in rings, i.e. to enable the pipes to be laid with the minimum of joints. Pipe rings, however, are not feasible with pipes of large diameter, for example where the diameter amounts to 70 mm, the delivery of the pipe material in the form of rings must be refrained from since the pipe rings would be of such magnitude as to render it impossible to transport the rings by car or train. In this instance, the heavy pipe can be placed on trailer vehicles and permitted to adjust themselves during transport with the movements occurring between the different trailers, as with the conventional method of transporting heavy plastic tubing, this adjustment of the pipes during transport being possible as a result of their elastic properties.

The pipe laying method of the present invention greatly simplifies the construction of heat distributing systems for example, since it is possible thereby to use pre-insulated pipes in long lengths, thereby avoiding the hitherto necessary large number of welding joints and the subsequent necessity of insulating at least said joints. Since, in addition, no complicated means are required for taking up the variations in pipe lengths, said means requiring inspection and maintenance, the claimed method affords further economic advantages in comparison with previously used systems.

Thus, as is clear from the drawings, the gently undulating or sinuous nature of the wave form of the instant serpentine or meandering composite precovered pipe in its covered and immobilized arrangement within the filled in trench is inherently insufficient to create any significant additional flow resistance, i.e. fluid stress, of the flowing media through the pipe, as would occur with conventional arrangements of expansion loops or expansion boxes which necessarily have pronounced bends or curves in the particular pipe. Moreover, the constitution and disposition of the instant pipe surrounded by the relatively elastic heat insulating jacket enclosed within the sealing and supporting casing is such that the composite continuous precovered pipe in prefabricated cuttable length form is capable of being bended into such gentle wave form, even at the trench site, and the so-arranged or distributed continuous wave form precovered pipe length selected is such that it permits relative axial and radial, or longitudinal and cross-wise, movements of the pipe with respect to the jacket in response to thermal expansion and contraction of the pipe without disturbing the spatial disposition of the casing in its covered and immobilized condition within the filled in trench, whereby to provide substantially mechanically stress-free thermal expansion and contraction of the pipe incrementally and cumulatively along and within the confines of the linear distance between the corresponding fixed pipe connection points therefor at the variable temperatures to which the same is subjected in the conveying of the flowing media therethrough.

Hence, the method of the invention inherently enables such composite precovered pipe to be laid in the ground for conveying flowing media at variable temperatures in substantially stress-free manner between fixed pipe connecting points, including not only substantially fluid stress-free or flow resistance-free conveying of such media therethrough at variable temperatures at which the pipe is subjected to thermal expansion and contraction, but also substantially mechanically stress-free thermal expansion and contraction of the pipe at such variable temperatures. In turn, the invention also provides a corresponding composite precovered pipe arrangement produced by such method.

The invention is not restricted to the described and illustrated embodiments, but can be modified within the scope of the following claims.

What is claimed is:

1. Method of laying pipe means in the ground for substantially fluid stress-free conveying of flowing media therethrough at variable temperatures at which the pipe means is subjected to thermal expansion and contraction and for substantially mechanically stress-free thermal expansion and contraction of the pipe means at such variable termpatures, which comprises laying a precovered pipe means of selective length in a pipe means-receiving ground trench in wave form along the trench for operative connection at a pair of pipe means connecting points spaced apart a linear distance along the trench, the selective length of the precovered pipe means being sufficient for the precovered pipe means to be distributed along and within such linear distance in wave form for substantially fluid stress-free conveying of flowing media therethrough, said precovered pipe means being in the form of a pipe means provided with a relatively elastic heat insulating jacket which is capable of being bended into wave form and which in wave form permits relative axial and radial movements of the pipe means with respect to the jacket in response to thermal expansion and contraction of the pipe means, and filling in the trench to cover and immobilize the jacket in wave form therein while permitting the pipe means therewithin to execute such relative axial and radial movements with respect to the jacket for substantially mechanically stress-free thermal expansion and contraction of the pipe means along and within the linear distance between the pipe means connecting points.

2. Method according to claim 1 wherein the precovered pipe means is supported in wave form in the trench by support means prior to filling in the trench.

3. Method according to claim 2 wherein the precovered pipe means is supported in wave form in the trench by anchoring means driven into the trench prior to filling in the trench.

4. Method according to claim 1 wherein the precovered pipe means extends in wave form substantially in a horizontal plane.

5. Method according to claim 1 wherein the precovered pipe means extends in wave form substantially in a vertical plane.

6. Method of laying pipe means in the ground for substantially fluid stress-free conveying of flowing media therethrough at variable temperatures at which the pipe means is subjected to thermal expansion and contraction and for substantially mechanically stress-free thermal expansion and contraction of the pipe means at such variable temperatures, which comprises digging a pipe means-receiving ground trench between a pair of pipe means connecting fixed points spaced apart a linear distance, laying a continuous precovered pipe means of selective length in the trench in continuous gentle wave form along the trench for operative connection at the pair of pipe means connecting points spaced apart such linear distance along the trench, the selective length of the precovered pipe means being sufficient for the precovered pipe means to be distributed along and within such linear distance in such continuous gentle wave form for substantially fluid stress-free conveying of flowing media therethrough, said precovered pipe means being prefabricated in the form of a cuttable length continuous pipe means provided with a relatively elastic heat insulating jacket enclosed within a sealing and supporting casing which is capable of being bended into wave form and which in wave form permits relative axial and radial movements of the pipe means with respect to the jacket in response to thermal expansion and contraction of the pipe means without disturbing the casing, and connecting operatively said pipe means to the corresponding pipe means connecting fixed points and filling in the trench to cover and immobilize the casing and jacket in wave form therein while permitting the pipe means therewithin to execute such relative axial and radial movements with respect to the jacket for substantially mechanically stress-free thermal expansion and contraction of the pipe means along and within the linear distance between the pipe means connecting points.

7. Method according to claim 6 wherein the trench is dug as a substantially parallel sided trench.

* * * * *